Figure 1:
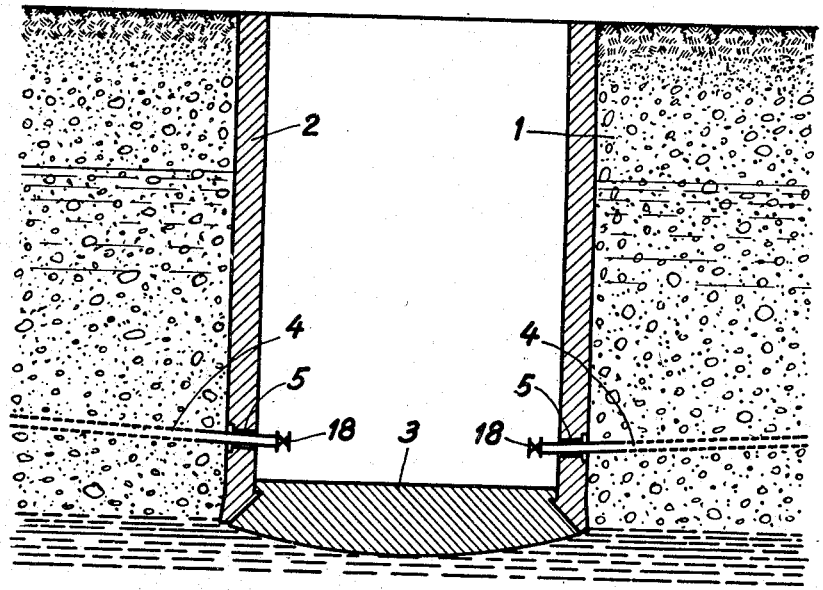

April 24, 1951 H. FEHLMANN 2,550,408
METHOD AND DEVICE FOR MAKING WATER-HANDLING INSTALLATIONS
AND INSTALLATIONS MADE ACCORDING TO THIS METHOD
Filed Dec. 26, 1947 2 Sheets-Sheet 2

Patented Apr. 24, 1951

2,550,408

UNITED STATES PATENT OFFICE 2,550,408

METHOD AND DEVICE FOR MAKING WATER-HANDLING INSTALLATIONS AND INSTALLATIONS MADE ACCORDING TO THIS METHOD

Hans Fehlmann, Berne, Switzerland

Application December 26, 1947, Serial No. 794,327
In Switzerland June 14, 1946

Section 1, Public Law 690, August 8, 1946
Patent expires June 14, 1966

12 Claims. (Cl. 255—1.8)

This invention relates to a method and device for making water handling installations having a substantially vertical shaft and screening tubes projected laterally with respect to the axis of the vertical shaft.

The invention also relates to an installation made according to this method.

Installations of this kind may serve both for recovering water from and/or supplying water to subterranean formations.

Installations with screening tubes projected laterally with respect to the shaft axis are well-known. These tubes, e. g., serve to improve the yieldingness of such installations with regard to ordinary vertical wells. Up till now, hydraulic pressure was applied to these screening tubes themselves to drive them through openings of the shaft into the soil. For this reason thick walls had to be given to these tubes to provide for sufficient strength resisting the load caused by the advance of the tubes in the subterranean formation. In consequence, the price of these tubes was very high. Moreover, the strength requirements did not allow to exceed a certain inlet area of the slots of the screening tubes, a circumstance having a bad effect on the yieldingness of the well. When driving these perforated or screening tubes into the soil danger occurred for the slots of the tubes of becoming clogged with soil material.

The invention remedies these inconveniences.

An object of the invention is to advance imperforate boring tubes from the shaft to the subterranean formation, then introducing screening tubes into the imperforate boring tubes, and afterwards withdrawing the imperforate boring tubes from the subterranean formation towards the shaft. Now, the advance-load is no longer borne by the screening tubes but by the imperforate tubes which are dimensioned accordingly. Of course, these boring tubes are expensive, but after the projecting operation they are withdrawn and can be used again and again. Since the screening tubes must no longer bear the advance-load their walls may be thinner and their price, in consequence, considerably lower than before. Moreover, the inlet area of the slots of the tubes may be substantially increased and the yielding of the well improved. Clogging of the slots is no longer to be feared.

Another object is to surround the screening tubes with wire netting of fine mesh when boring into fine material. This was impossible when the perforate tubes were directly driven into the soil.

Figure 2:
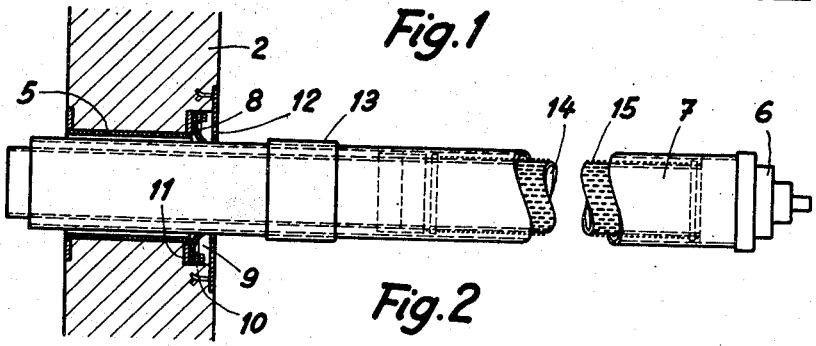
Figure 3:
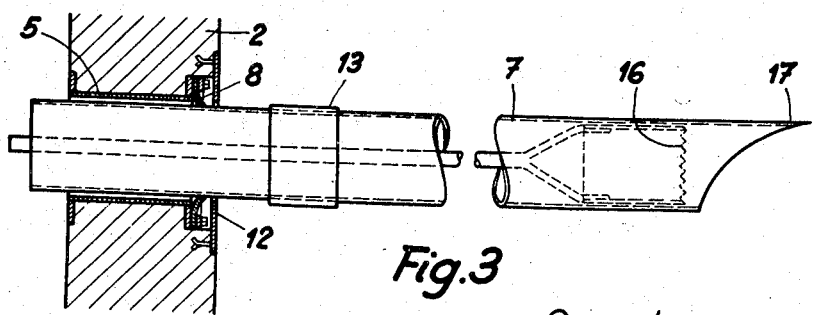

Other objects and features will be apparent as the following description proceeds, reference being had to the accompanying drawings, wherein Fig. 1 is an axial section through the shaft of a well, Fig. 2 illustrates a first, and Fig. 3 a second example of imperforate boring tubes forming part of the device for carrying the method into effect.

Figure 4:
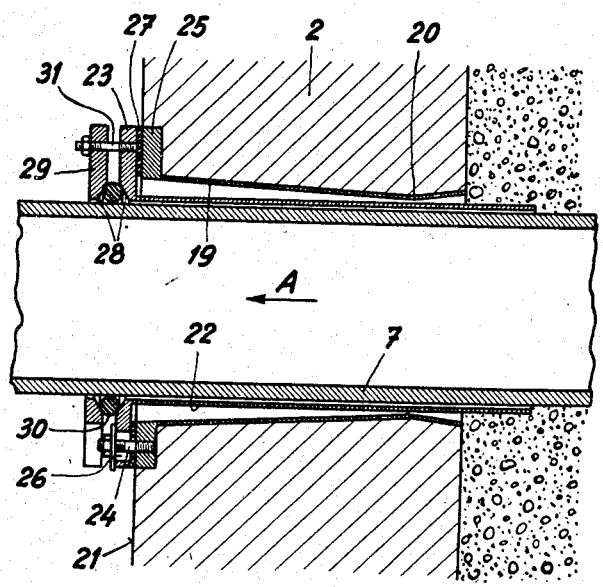

Fig. 4 is an axial section through a special arrangement for projecting the boring tubes laterally through the wall of the shaft.

Into the subterranean water-bearing formation 1 the shaft 2 of the well is sunk and sealed by the concrete bottom 3. Substantially radially with respect to the shaft 2 and at a small level above the bottom 3 perforated or screening tubes 4 extend into the water bearing formation 1. These tubes are slightly inclined downwards the shaft 1 but might as well run horizontally. Each of these screening tubes 4 is totally or partly closable by a valve 18 so as to control the flow of water to the shaft 2. The screening tubes 4 pass through guide cylinders 5 from eternite, steel, etc., provided in the shaft wall. On building the shaft 2 these guide cylinders 5 are closed towards the outside by wooden plugs (not shown).

For projecting the screening tubes 4, imperforate boring tubes 7 are at first advanced from the shaft into the formation 1 by percussion or pressing (e. g. by means of a hydraulic press), these boring tubes, on their advance, pushing out the wooden plugs. The imperforate boring tubes 7 which are so dimensioned that they resist the load caused by their advancing through the water-bearing stratum, may either be closed or open at the fore end.

Fig. 2 illustrates an imperforate boring tube 7 with its fore end closed by a boring head 6. This boring tube passes through the guide cylinder 5. The interior of the shaft is sealed against the outside by a rubber ring 8 maintaining a watertight joint with the boring tube 7. This rubber ring 8 is lodged in a recess 9 of the shaft wall and clamped fast on the flange 11 of the cylinder 5 by means of a ring 10. The rubber ring 8 is protected towards the outside by a plate 12. The boring tube 7 is built up from tube sections coupled together by connection pieces 13. As often as the boring tube has been advanced by the length of a tube section, a new section is coupled with the former in the shaft and then advanced into the soil, these operations being repeated until the length desired of the screening tube to be projected is reached. When the boring has been extended up to this length, perforate screening tubes 14 from galvanised sheet steel, stainless steel, light metal alloy, brass, copper, earthenware, concrete or from another material impervious to corrosion are inserted into the imperforate boring tubes. These screening tubes, too, are built up from tube sections. If the strata pierced through of the water-bearing formation 1 are of such a fine granulation that collapses are to be feared, the screening tubes may be surrounded by a wire netting 15 of fine mesh, e. g. from copper or brass, or the screening tube section in question may be replaced by an imperforate tube section. The screening tubes once in place, water under pressure is given into the boring tubes for ejecting the boring heads 6, whereupon the boring tubes may be withdrawn, leaving behind the last tube section in the guide cylinder 5 for maintaining the watertight joint of the rubber ring 8.

Should it not be desired to leave behind an entire tube section in the cylinder 5, the hind end of this section may be screwed to the remaining section portion. When, on withdrawing the imperforate boring tubes, this end comes into reach of the rubber ring 8, the remaining section portion is unscrewed from this end, so that only this latter is left behind in the shaft wall. If necessary, the section end may be wedged in the guide cylinder 5 before unscrewing.

The boring head of Fig. 2 might be perforated, to permit material to enter the interior or to render possible scavenging through the boring tubes. The boring head might also be conical or have the form of a triangular or polygonal pyramid. These conical or pyramidal heads, too, may be perforated or imperforate.

The boring tube 7 shown in Fig. 3 is similar to that of Fig. 2 with the exception of the fore end of the boring head which is open. This permits material loosened during the boring operation to be taken in by means of a tool 16. This allows the soil material to be continuously examined and information to be obtained as to the strata pierced through, boring profiles to be made and the porosity to be approximately determined. The direction taken by the boring head can be influenced by a special shaping of the open fore end of the head. In Fig. 3 the upper portion 17 of the head is longer than the lower one. This permits material to enter into the boring tube easier from the bottom than from the top, so that the tube bears downwards.

The selection of the type of head to be used depends on the hydrostatic pressure and the kind and yielding of the water-bearing formation.

According to the friction between the stratum in which to advance and the boring tube a so-called telescopic boring operation may be carried out for easier projecting of the tubes, i. e. with increasing length of the bore hole its diameter may be gradually decreased by using boring tube sections of smaller diameters. The water supply to the screening tubes increasing towards the shaft, staggering these perforate tubes, that is, increasing their diameter towards the shaft will be useful.

When using the guide cylinders 5 in Figs. 2 and 3, it often happens that on withdrawing the bore tubes a great resistance between the latter and the cylinders 5 occurs, especially when the boring tubes on their advance veered away from the axial direction of the cylinders. This inconvenience can be done away with by using a means as shown in Fig. 4, where the guides for the boring tubes are conical so that lateral displacement of these tubes becomes possible. In the wall of the shaft 2 a guide 19 is provided, outtapering from the interior 21 of the shaft outwards to the narrowest section 20. From this section outwards the guide 19 forms likewise a truncated cone which receives a wooden plug (not shown) as mentioned with regard to the former embodiment.

A guide sleeve 22 of thin sheet metal is accommodated in the conical guide 19, surrounding the boring tube 7 and having a flange 23 on its inner end. This flange 23 is fixed by means of screws 24 to a flange 25 of the conical guide 19.

The screws 24 pass with great play through holes 26 of the flange 23 of the guide sleeve 22. A packing 27 is inserted between the flanges 23 and 25. The bore holes of the flanges 23 and 29 are surrounded by conical surfaces 28, a packing ring 30 being provided between the flanges 23 and 29 in reach of these surfaces 28. Flange 29 is fixed to the flange 23 by means of screws 31. On tightening these screws 31, the packing ring 30, by the intermediary of the conical surfaces 28, is pressed against the boring tube 7.

For withdrawal of the boring tube 7 in the direction of the arrow A in Fig. 4, it is attached to a hydraulic press (not shown) placed in the interior of the shaft and by which the tube 7 was also advanced. Now, if the boring tube opposes too great a resistance to the withdrawal, the screws 24 are so loosened that a lateral displacement of the guide sleeve 22 together with the boring tube 7 within the conical guide 19 becomes possible while the watertight joint between the packing 27 and the flanges 23 and 25 is maintained. The direction of the boring tube 7 may now be altered by adjusting the direction of the press (not shown) until withdrawal of the boring tube becomes easier. Then, the screws 24 are retightened. During this adjusting operation the relative position of the boring tube 7 and flanges 23 and 29 has not been changed, so that the watertight joint between the packing ring 30 and the boring tube 7 is maintained.

Water handling installations according to the invention may, of course, also be made for supplying water to subterranean formations.

What I claim is:

1. In a method of making a water handling installation having a substantially vertical shaft sunk into a water-bearing formation and screening tubes projecting laterally from the vertical shaft, the steps of erecting a vertical shaft; sealing the bottom of the shaft; making a lateral guide opening in the wall of the shaft; introducing an imperforate boring tube carrying a boring head into the guide opening; advancing the boring tube into the water-bearing formation; inserting a perforate screening tube into the imperforate boring tube; separating the boring head from the imperforate boring tube; and withdrawing the imperforate boring tube substantially entirely from the perforate screening tube.

2. In a method of making a water handling installation having a substantially vertical shaft sunk into a water-bearing formation and screening tubes projecting laterally from the vertical shaft, the steps of erecting a vertical shaft; sealing the bottom of the shaft; making a lateral guide opening in the wall of the shaft; introducing an imperforate boring tube carrying a boring head into the guide opening; advancing the boring tube into the water-bearing formation;

subjecting the boring tube to a lateral displacement; inserting a perforate screening tube into the imperforate boring tube; separating the boring head from the imperforate boring tube; and withdrawing the imperforate boring tube substantially entirely from the perforate screening tube.

3. In a method of making a water handling installation having a substantially vertical shaft sunk into a water-bearing formation and screening tubes projecting laterally from the vertical shaft, the steps of erecting a vertical shaft; sealing the bottom of the shaft; making a lateral guide opening in the wall of the shaft; introducing an imperforate boring tube carrying a boring head into the guide opening, said boring tube having a section having a forward part and a remaining portion screwed together; advancing the boring tube into the water-bearing formation; inserting a perforate screening tube into the imperforate boring tube; separating the boring head from the imperforate boring tube; withdrawing the imperforate boring tube substantially entirely from the perforate screening tube; leaving the forward part of said section of the boring tube in the wall of the shaft; and unscrewing the remaining portion of said section from the forward part of said section.

4. In a method of making a water handling installation having a substantially vertical shaft sunk into a water-bearing formation and screening tubes projecting laterally from the vertical shaft, the steps of erecting a vertical shaft; sealing the bottom of the shaft; making a lateral guide opening in the wall of the shaft; introducing an imperforate boring tube carrying a boring head into the guide opening, said boring tube having a section having a forward part and a remaining portion screwed together; advancing the boring tube into the water-bearing formation; subjecting the boring tube to a lateral displacement; inserting a perforate screening tube into the imperforate boring tube; separating the boring head from the imperforate boring tube; withdrawing the imperforate boring tube substantially entirely from the perforate screening tube; leaving the forward part of said section of the boring tube in the wall of the shaft; and unscrewing the remaining portion of said section from the forward part of said section.

5. In a device for making a water handling installation having a substantially vertical shaft in combination, an imperforate boring tube projecting laterally from the shaft; a screening tube subsequently arranged inside and adapted to project from said boring tube; and conical guide means in the wall of the shaft for the boring tube, the conical guide means allowing the boring tube to be laterally displaced in said conical guide means.

6. In a device for making a water handling installation having a substantially vertical shaft in combination, an imperforate boring tube projecting laterally from the shaft; a screening tube subsequently arranged inside and adapted to project from said boring tube; a conical guide means in the wall of the shaft; and a guide sleeve for the boring tube arranged in said conical guide means; said guide sleeve and the boring tube being arranged for lateral displacement in said conical guide.

7. In a device for making a water handling installation having a substantially vertical shaft in combination, an imperforate boring tube projecting laterally from the shaft; a screening tube subsequently arranged inside and adapted to project from said boring tube; a conical guide means having a first flange in the wall of the shaft; a guide sleeve for the boring tube arranged in said conical guide means; and having a second flange; and means for detachably connecting said first flange and said second flange to each other; said guide sleeve and the boring tube being arranged for lateral displacement in said conical guide.

8. In a device for making a water handling installation having a substantially vertical shaft in combination, an imperforate boring tube projecting laterally from the shaft; a screening tube subsequently arranged inside and adapted to project from said boring tube; a conical guide means having a first flange in the wall of the shaft; a guide sleeve for the boring tube arranged in said conical guide means and having a second flange; means for detachably connecting said first flange and said second flange to each other; said guide sleeve and the boring tube being arranged for lateral displacement in said conical guide; a third flange loosely arranged around the boring tube; and a packing arranged between said second flange and said third flange in contact with the boring tube; and means for pressing said second flange and said third flange against each other whereby said packing forms a water-tight joint between the boring tube and said guide sleeve maintaining its tightening effect at lateral displacements of said guide sleeve and said boring tube.

9. In a device for making a water handling installation having a substantially vertical shaft, in combination, an imperforate boring tube projecting laterally from the shaft; a screening tube subsequently arranged inside and projecting from the boring tube; a wire netting surrounding said screening tube; and conical guide means in the wall of the shaft for the boring tube, the conical guide means allowing the boring tube to be laterally displaced in said conical guide means.

10. In a method of making a water handling installation having a substantially vertical shaft sunk into a water-bearing formation and having a screening tube projecting laterally from the vertical shaft, the steps of erecting a vertical shaft, making a lateral guide opening in the wall of the shaft, introducing an imperforate boring tube having a boring head into the guide opening, then introducing a perforate screening tube into the imperforate boring tube, and thereafter withdrawing the imperforate boring tube while leaving the boring head in the subterranean formation.

11. A water handling installation sunk in a water-bearing formation comprising a substantially vertical shaft, a lateral opening in the wall of the shaft, a guide tube in the opening, a boring tube extending through the guide tube, a boring head, and a screening tube of insufficient strength for sole insertion positioned inside the boring tube and supported at one end by the guide tube and having its outer end extending into the water-bearing formation, the boring tube adapted to be withdrawn at least partially leaving the boring head in position at the end of the screening tube.

12. A water handling installation sunk in a water-bearing formation comprising a substantially vertical shaft, a lateral opening in the wall of the shaft, a guide tube in the opening, a boring tube extending through the guide tube, a boring head, and a screening tube of insufficient strength for sole insertion positioned inside the boring tube and supported at one end by the guide tube and having its outer end extending into the water-bearing formation, the boring tube adapted to be withdrawn at least partially leaving the boring head in position at the end of the screening tube, the guide means including two frusto-conical parts connected at the smaller bases thereof.

HANS FEHLMANN.

REFERENCES CITED

The following references are of record in the file of this patent:

UNITED STATES PATENTS

| Number | Name | Date |
|---|---|---|
| 459,826 | Cook | Sept. 22, 1891 |
| 1,983,428 | Zeidler | Dec. 4, 1934 |
| 2,126,575 | Ranney | Aug. 9, 1938 |
| 2,136,151 | Parrish | Nov. 8, 1938 |
| 2,383,496 | Nebolsine | Aug. 28, 1945 |